(12) United States Patent
Allen et al.

(10) Patent No.: US 9,473,583 B2
(45) Date of Patent: Oct. 18, 2016

(54) METHODS AND SYSTEMS FOR PROVIDING DECISION-MAKING SUPPORT

(71) Applicant: LinkedIn Corporation, Mountain View, CA (US)

(72) Inventors: Christina Allen, Palo Alto, CA (US); Farid Hosseini, San Francisco, CA (US); M. Christopher Pruet, Los Gatos, CA (US); Sarah Jean Culberson Alpern, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 155 days.

(21) Appl. No.: 13/710,248

(22) Filed: Dec. 10, 2012

(65) Prior Publication Data

US 2014/0164952 A1 Jun. 12, 2014

(51) Int. Cl.
| | | |
|---|---|---|
| *G06F 3/048* | (2013.01) | |
| *H04L 29/08* | (2006.01) | |
| *G06F 17/30* | (2006.01) | |
| *G06Q 10/10* | (2012.01) | |
| *G06Q 50/00* | (2012.01) | |

(52) U.S. Cl.
CPC .............. *H04L 67/22* (2013.01); *G06F 17/30* (2013.01); *G06F 17/3053* (2013.01); *G06F 17/30554* (2013.01); *G06Q 10/105* (2013.01); *G06Q 50/01* (2013.01); *H04L 67/306* (2013.01)

(58) Field of Classification Search
CPC ............................. G06F 3/048–3/0484; G06F 17/3053–17/30958; G06Q 10/10–10/107; G06Q 30/02–30/0269; G06Q 50/01
See application file for complete search history.

(56) References Cited

U.S. PATENT DOCUMENTS

| | | |
|---|---|---|
| 6,594,673 B1 | 7/2003 | Smith et al. |
| 7,539,697 B1 | 5/2009 | Akella |
| 7,593,740 B2 | 9/2009 | Crowley et al. |
| 7,945,862 B2 | 5/2011 | Aldrich et al. |
| 8,060,451 B2 | 11/2011 | Degeratu et al. |
| 8,412,564 B1 | 4/2013 | Thell et al. |
| 8,650,177 B2 | 2/2014 | Skomoroch et al. |
| 8,661,034 B2 | 2/2014 | Polonsky et al. |

(Continued)

FOREIGN PATENT DOCUMENTS

| | | |
|---|---|---|
| CN | 103502975 A | 1/2014 |
| DE | 212013000002 U1 | 9/2013 |
| WO | WO-2013131108 A1 | 9/2013 |

OTHER PUBLICATIONS

CollegeView Website http://www.collegeview.com/index.jsp, snapshot of Nov. 23, 2012, downloaded from www.archive.org using the Wayback machine on Nov. 10, 2014.*

(Continued)

*Primary Examiner* — Claudia Dragoescu
(74) *Attorney, Agent, or Firm* — Schwegman Lundberg & Woessner, P.A.

(57) ABSTRACT

Method, apparatus, and articles of manufacture for presenting a decision user interface to a first member of a social network service, receiving information identifying a set of interests of the first member entered at the decision user interface, searching at least one of the group consisting or profiles of members of the social network service and user decision interfaces presented to members of the social network service and, responsive to searching, providing information relating to the set of interests to the first member. The set of interests may include a field of study or an organization or an academic degree.

12 Claims, 10 Drawing Sheets

(56) References Cited

U.S. PATENT DOCUMENTS

| | | | |
|---|---|---|---|
| 8,935,263 | B1 | 1/2015 | Rodriguez et al. |
| 8,938,690 | B1 | 1/2015 | Khouri et al. |
| 2002/0181685 | A1 | 12/2002 | Doherty et al. |
| 2003/0105682 | A1* | 6/2003 | Dicker .................. G06Q 30/02 705/26.8 |
| 2003/0187813 | A1 | 10/2003 | Goldman et al. |
| 2005/0015432 | A1 | 1/2005 | Cohen |
| 2005/0159970 | A1 | 7/2005 | Buyukkokten et al. |
| 2005/0165594 | A1 | 7/2005 | Chandra et al. |
| 2006/0042483 | A1 | 3/2006 | Work et al. |
| 2006/0136419 | A1 | 6/2006 | Brydon et al. |
| 2006/0184464 | A1 | 8/2006 | Tseng et al. |
| 2006/0218111 | A1 | 9/2006 | Cohen |
| 2006/0229896 | A1 | 10/2006 | Rosen et al. |
| 2007/0106780 | A1 | 5/2007 | Farnham et al. |
| 2007/0202475 | A1 | 8/2007 | Habichler et al. |
| 2008/0065481 | A1 | 3/2008 | Immorlica et al. |
| 2008/0077461 | A1 | 3/2008 | Glick |
| 2008/0172415 | A1 | 7/2008 | Fakhari et al. |
| 2008/0313000 | A1 | 12/2008 | Degeratu et al. |
| 2009/0006193 | A1 | 1/2009 | Forbes et al. |
| 2009/0027392 | A1 | 1/2009 | Jadhav et al. |
| 2009/0228830 | A1 | 9/2009 | Herz et al. |
| 2009/0299990 | A1 | 12/2009 | Setlur et al. |
| 2010/0082427 | A1 | 4/2010 | Burgener et al. |
| 2010/0161369 | A1 | 6/2010 | Farrell et al. |
| 2010/0169364 | A1 | 7/2010 | Hardt |
| 2010/0293247 | A1 | 11/2010 | Mckee et al. |
| 2011/0078188 | A1 | 3/2011 | Li et al. |
| 2011/0196924 | A1 | 8/2011 | Hargarten et al. |
| 2011/0209068 | A1 | 8/2011 | Vemuri |
| 2011/0213785 | A1 | 9/2011 | Kristiansson et al. |
| 2011/0238591 | A1 | 9/2011 | Kerr et al. |
| 2011/0258042 | A1 | 10/2011 | Purvy et al. |
| 2011/0288851 | A1 | 11/2011 | Duan |
| 2011/0302159 | A1 | 12/2011 | Mikesell et al. |
| 2012/0011015 | A1* | 1/2012 | Singh ..................... G06Q 10/10 705/26.1 |
| 2012/0023030 | A1 | 1/2012 | Jeffries |
| 2012/0095933 | A1 | 4/2012 | Goldberg |
| 2012/0110071 | A1 | 5/2012 | Zhou et al. |
| 2012/0197733 | A1 | 8/2012 | Skomoroch et al. |
| 2012/0197863 | A1 | 8/2012 | Skomoroch et al. |
| 2012/0197906 | A1 | 8/2012 | Landau et al. |
| 2012/0197993 | A1 | 8/2012 | Skomoroch et al. |
| 2012/0226623 | A1* | 9/2012 | Jurney et al. .................. 705/321 |
| 2012/0259791 | A1 | 10/2012 | Zoidze |
| 2012/0311462 | A1* | 12/2012 | Devecka ....................... 715/753 |
| 2013/0046704 | A1 | 2/2013 | Patwa et al. |
| 2013/0091071 | A1 | 4/2013 | Davies |
| 2013/0124268 | A1 | 5/2013 | Hatton et al. |
| 2013/0159325 | A1 | 6/2013 | Polonsky et al. |
| 2013/0212032 | A1 | 8/2013 | Cox et al. |
| 2013/0254213 | A1 | 9/2013 | Cheng et al. |
| 2013/0254303 | A1 | 9/2013 | Cheng et al. |
| 2013/0254305 | A1 | 9/2013 | Cheng et al. |
| 2014/0025427 | A1 | 1/2014 | Bastian et al. |
| 2014/0074740 | A1* | 3/2014 | Phillips ................ G06Q 50/205 705/328 |
| 2014/0081928 | A1 | 3/2014 | Skomoroch et al. |
| 2014/0129631 | A1 | 5/2014 | Jayaram et al. |
| 2014/0164512 | A1 | 6/2014 | Allen et al. |
| 2015/0026120 | A1 | 1/2015 | Chrapko et al. |

OTHER PUBLICATIONS

U.S. Appl. No. 13/716,003, Non Final Office Action mailed Dec. 19, 2014, 13 pgs.
U.S. Appl. No. 13/357,171, Non Final Office Action mailed Jun. 17, 2013, 9 pgs.
U.S. Appl. No. 13/357,171, Notice of Allowance mailed Oct. 1, 2013, 10 pgs.
U.S. Appl. No. 13/357,171, Response filed Sep. 17, 2013 to Non Final Office Action mailed Jun. 17, 2013, 12 pgs.
U.S. Appl. No. 13/357,360, Final Office Action mailed Jun. 27, 2013, 22 pgs.
U.S. Appl. No. 13/357,360, Non Final Office Action mailed Oct. 11, 2012, 13 pgs.
U.S. Appl. No. 13/357,360, Response filed Mar. 18, 2013 to Non Final Office Action mailed Oct. 11, 2012, 17 pgs.
U.S. Appl. No. 13/357,360, Response filed Nov. 20, 2013 to Final Office Action mailed Jun. 27, 2013, 18 pgs.
U.S. Appl. No. 13/430,284, Non Final Office Action mailed Oct. 23, 2014, 19 pgs.
U.S. Appl. No. 13/430,284, Response filed Apr. 23, 2015 to Non Final Office Action mailed Oct. 23, 2014, 10 pgs.
U.S. Appl. No. 13/482,884, Final Office Action mailed Feb. 6, 2014, 19 pgs.
U.S. Appl. No. 13/482,884, Non Final Office Action mailed Jul. 15, 2013, 19 pgs.
U.S. Appl. No. 13/482,884, Non Final Office Action mailed Jul. 16, 2015, 26 pgs.
U.S. Appl. No. 13/482,884, Non Final Office Action mailed Oct. 3, 2012, 19 pgs.
U.S. Appl. No. 13/482,884, Non Final Office Action mailed Nov. 19, 2014, 23 pgs.
U.S. Appl. No. 13/482,884, Response filed Jan. 2, 2013 to Non Final Office Action mailed Oct. 3, 2012, 11 pgs.
U.S. Appl. No. 13/482,884, Response filed Mar. 19, 2015 to Non Final Office Action mailed Nov. 19, 2014, 25 pgs.
U.S. Appl. No. 13/482,884, Response filed Jul. 7, 2014 to Final Office Action mailed Feb. 6, 2014, 12 pgs.
U.S. Appl. No. 13/482,884, Response filed Nov. 15, 2013 to Non Final Office Action mailed Jul. 15, 2013, 11 pgs.
U.S. Appl. No. 13/548,957, Non Final Office Action mailed Jun. 18, 2015, 20 pgs.
U.S. Appl. No. 13/672,377, Final Office Action mailed Jul. 2, 2015, 8 pgs.
U.S. Appl. No. 13/672,377, Non Final Office Action mailed Dec. 4, 2014, 9 pgs.
U.S. Appl. No. 13/672,377, Response filed Apr. 6, 2015 to Non Final Office Action mailed Dec. 4, 2014, 13 pgs.
U.S. Appl. No. 13/716,003. Response filed Apr. 20, 2015 to Non Final Office Action mailed Dec. 19, 2014, 11 Pgs.
U.S. Appl. No. 14/072,955, Non Final Office Action mailed May 9, 2014, 11 pgs.
U.S. Appl. No. 14/072,955, Preliminary Amendment filed Dec. 10, 2013, 10 pgs.
European Application Serial No. 13733942.0, Office Action mailed Nov. 4, 2013, 2 pgs.
International Application Serial No. PCT/US2013/033857, International Preliminary Report on Patentability mailed Oct. 9, 2014, 9 pgs.
International Application Serial No. PCT/US2013/033857, International Search Report mailed Jul. 2, 2013, 2 pgs.
International Application Serial No. PCT/US2013/033857, Written Opinion mailed Jul. 2, 2013, 7 pgs.
International Application Serial No. PCT/US2013/068763, International Search Report mailed May 2, 2014, 2 pgs.
International Application Serial No. PCT/US2013/068763, Written Opinion mailed May 2, 2014, 5 pgs.
Ackerman, Mark, "Sharing Expertise: Beyond Knowledge Management", The MIT Press (Cambridge, Massachusetts), (2003), 438 pgs.
Becerra-Fernandez, Irma, "Searching for Experts on the Web: A Review of Contemporary Expertise Locator Systems", ACM Transactions on Internet Technology 6(4), (Nov. 2006), 333-355.
D'Amore, Raymond, "Expertise Community Detection", SIGIR, (Jul. 25-29, 2004), 498-499.
Dom, Byron, et al., "A Bayesian Technique for Estimating the Credibility of Question Answerers", SIAM, (2008), 399-409.
Dom, Byron, et al., "Graph-Based Ranking Algorithms for E-mail Expertise Analysis", DMKD, (Jun. 13, 2003), 42-48.
Fu, Yupeng, et al., "Finding Experts Using Social Network Analysis", IEEE/WIC/ACM International Conference on Web Intelligence, (2007), 77-80.

(56) References Cited

OTHER PUBLICATIONS

Grolmus, Petr, et al., "A Web-Based User-Profile Generator: Foundation for a Recommender and Expert Finding System", 8th ICCC International Conference on Electronic Publishing, (Jun. 2004), 331-342.

Haselmann, Till, et al., "Towards a Conceptual Model for Trustworthy Skills Profiles in Online Social Networks", ERCIS, (2010), 13 pgs.

Huh, Eui-Nam, et al., "A Framework of Online Community based Expertise Information Retrieval on Grid", Kyung Hee University Memo, (Aug. 11, 2008), 21 pgs.

Huh, Eui-Nam, et al., "A Framework of Online Community based Expertise Information Retrieval on Grid", Kyung Hee University Memo, (Jan. 14, 2010), 21 pgs.

John, Ajita, et al., "Collaborative Tagging and Expertise in the Enterprise", WWW2006, (May 22-26, 2006), 6 pgs.

Li, Juanzi, et al., "EOS: Expertise Oriented Search Using Social Networks", WWW 2007 / Poster Paper, (May 8-12, 2007), 1271-1272.

Lin, Ching-Yung, et al., "SmallBlue: Social Network Analysis for Expertise Search and Collective Intelligence", IEEE International Conference on Data Engineering, (2009), 1483-1486.

Malek, Maria, et al., "Exhaustive and Guided Algorithms for Recommendation in a Professional Social Network", EISTI-Laris laboratory, PRES Cergy University, (Jul. 31, 2010), 19 pgs.

Meyer, Bertolt, et al., "SkillMap: dynamic visualization of shared organizational context", Institute of Information Systems, Humboldt University Berlin, (Feb. 20, 2006), 13 pgs.

Pretschner, Alexander, "Ontology Based Personalized Search", Department of Electrical Engineering and Computer Science, University of Kansas, (1998), 125 pgs.

Stankovic, Milan, et al., "Looking for Experts? What can Linked Data do for you?", LDOW, (Apr. 27, 2010), 10 pgs.

Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.

Tang, Jie, et al., "ArnetMiner: An Expertise Oriented Search System for Web Community", International Semantic Web Conference—ISWC, (2007), 8 pgs.

Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.

Zhang, Jing, et al., "Expert Finding in a Social Network", Department of Computer Science and Technology, Tsinghua, University Database Systems for Advanced Applications—DASFAA, (2007), 1066-1069.

U.S. Appl. No. 13/716,003, Examiner Interview Summary mailed Nov. 20, 2015, 3 pgs.

U.S. Appl. No. 13/716,003, Final Office Action mailed Aug. 13, 2015, 15 pgs.

U.S. Appl. No. 13/716,003, Response filed Oct. 5, 2015 to Final Office Action mailed Aug. 13, 2015, 14 pgs.

U.S. Appl. No. 13/716,003, Notice of Allowance mailed Mar. 28, 2016, 16 pgs.

* cited by examiner

FIG. 4

METHODS AND SYSTEMS FOR PROVIDING DECISION-MAKING SUPPORT

TECHNICAL FIELD

The present disclosure generally relates to data processing systems and techniques for processing and presenting content within an online social network environment. More specifically, in one embodiment, methods and systems for analyzing and aggregating information to facilitate the decision-making process college-bound students go through in deciding on a school to attend. Students may provide career aspiration data to a user interface provided by a system that uses a recommendation engine and data from a vast social network of professionals to obtain collective recommendations for students making such a decision. Multiple input data can yield refinement of the recommendations

BACKGROUND

A social network service is a computer or web-based application that enables its members or users to establish links or connections with persons for the purpose of sharing information with one another. In general, a social network service enables people to memorialize or acknowledge the relationships that exist in their "offline" (i.e., real-world) lives by establishing a computer-based representation of these same relationships in the "online" world. Many social network services require or request that each member provides personal information about himself or herself, such as professional information including information regarding their educational background, employment positions that the member has held, and so forth. This information is frequently referred to as "profile" information, or "member profile" information. In many instances, social network services enable members, with the appropriate data access rights, to view the personal information (e.g., member profiles) of other members. Although such personal information about individual members can be useful in certain scenarios, it may not provide many insights into "big picture" questions about various university degrees, professions, careers, and individual jobs or employment positions, among other things.

Additional detail about the technological operation of social networks useful in embodiments hereof may be found in U.S. patent application Ser. No. 13/430,284 entitled "Leveraging a Social Graph for use with Electronic Messaging," assigned to the assignee of this patent, and incorporated herein by reference in its entirety.

DESCRIPTION OF THE DRAWINGS

Some embodiments are illustrated by way of example and not limitation in the FIG.s of the accompanying drawings, in which the same or similar reference numerals have been used to indicate the same or similar features unless otherwise indicated.

FIG. 4 shows a user interface in the form of a decision board according to an embodiment;

DETAILED DESCRIPTION

Figure 1:
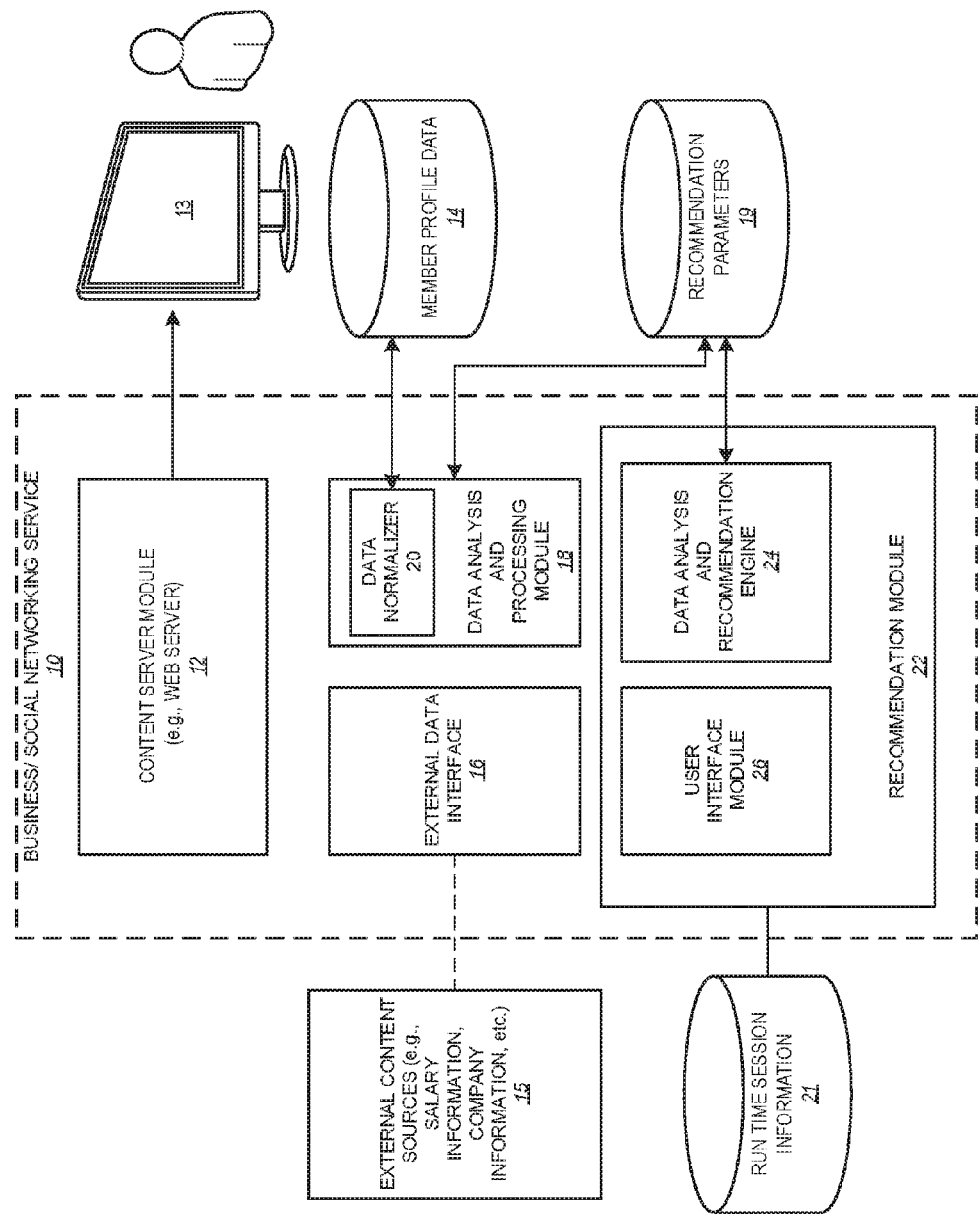
FIG. 1 is a functional block diagram illustrating various functional modules or components of a social/business network service, with which an embodiment described herein might be implemented.

Methods and systems for obtaining and presenting information about members of a social network service who share common interests in schools, degrees, fields of study, professions and other interests or attributes are described. For example, although an embodiment herein describes common interest in post-secondary schools, degrees, fields of study and careers, one of ordinary skill in the art will readily recognize that additional embodiments could describe common interests in the same general class of subject matter in respect of organizations such as high schools, elementary schools, and even professional certification or accreditation institutions (e.g., LSAT prep, CFA, and the like). Further, although members of a social network service are referred to herein (sometimes called "students" or "student members"), the term "member," "student," or "student member" may extend to any party having access rights to view a member's profile or other pages in the social network service, and who is looking for recommendations in making decisions based on real life outcome as described by information in member profiles.

In the following description, for purposes of explanation, numerous specific details are set forth in order to provide a thorough understanding of the various aspects of different embodiments of the present invention. It will be evident, however, to one skilled in the art, that the present invention may be practiced without these specific details.

Disclosed is a platform to provide, in one embodiment, support when making a decision to attend a school that is likely to lead to a desired career path. Such a platform will be referred to herein as a decision board or a decision user interface. A student may express his or her career aspirations by adding relevant data to a decision board, and obtain recommendations of schools likely to lead to that career, based on real career outcomes of members of a social network service. The recommendations may also relate to degrees, fields of study to undertake in order to improve the opportunity of reaching the desired career. Further, the student may invite friends and family, the student's network, and even alumni, to help the student decide on a degree, a field of study and/or a college to attend. This method is not limited to decisions relating to which school to attend and which fields of study to pursue, but may also be used as support after graduation for job decisions, for career milestone decisions, and other decisions that relate to member profiles. Generally, for the example of a student making a decision of what school to attend, a decision board is a place for student members to keep track of the schools, fields of studies and degrees they are interested in pursuing. A student can then share this information with their network so that they can get feedback and recommendations from others. The method of operation of the decision board in the embodiment includes recommending additional schools or fields of studies based on career outcome similarity based on actual career outcomes of members of the social networks service, as well as additional features.

A decision board is particularly useful since many social network services, and particularly those with a professional or business focus, request, or even require, members to provide various items of personal information, including information concerning a member's educational background, employment history and career. This information can then be used for recommending decisions based on data provided on the decision board, and can refine recommendations based on additional data provided on the decision board by the person seeking the recommendation. Social network service members may be prompted by the data entered on the decision board to provide information concerning the schools and universities attended, the dates or years of attendance, the subject matter concentration (e.g., academic concentration or major), as well as the professional certifications and/or academic degrees that the member has obtained. Similarly, a member may be prompted to provide information concerning the companies for which he or she has worked, the employment positions (e.g., job titles) held, the dates of such employment, the skills obtained, and any special recognition or awards received, the information indicating actual, real life, outcomes. The data that is requested and obtained may be structured, or unstructured. Other information may be requested and provided as well, such as a professional summary, which summarizes a member's employment skills and experiences, or an objective or mission statement, indicating the member's professional or career aspirations. For purposes of this disclosure, the above-described data or information is generally referred to as member profile data or member profile information. Furthermore, each individual item of data or information may be referred to as a member profile attribute. Member profile data, including career outcomes, can then be used for providing the above recommendations as herein described.

Consistent with some embodiments, a social network service includes a recommendation aggregation service, which is referred to hereinafter as a "recommendation engine" or "recommendation application." Consistent with some embodiments, the recommendation application analyzes and aggregates the member profile information of all (or some subset of) members of the social network service to provide, in one embodiment, a rich and easy to access set of tools that enables members to explore and discover a variety of recommendation information, and possibly trends, concerning various schools as they relate to industries, professions, employments positions, and/or careers.

FIG. 1 is a functional block diagram illustrating various functional modules or components of a business/social network service 10, with which an embodiment might be implemented. The various functional modules illustrated in FIG. 1 may be embodied in hardware, software, or a combination thereof. Furthermore, although shown in FIG. 1 as a single set of modules, a skilled artisan will appreciate that with some embodiments, the individual components may be distributed amongst many server computers, forming a distributed, cluster-based architecture. In addition, as presented in FIG. 1, the recommendation application is represented as recommendation module 22 integral with the social network service 10. In other embodiments, the recommendation application may be a separate web-based application that simply uses one or more sets of application programming interfaces (APIs) to leverage one or more separately hosted social network services. The term recommendation application and recommendation module may be used interchangeably herein to mean the same module or application.

As illustrated in FIG. 1, the social network service 10 includes a content server module (e.g., a web server module) 12 configured to send and receive information (e.g., web pages, or web-based content) with various web-based communication protocols to various client applications and devices, including web browser applications and/or other content rendering applications. With some embodiments, members interact with the service 10 via a web browser application, or some other content rendering application, that resides and executes on a client computing device, such as that with reference number 13 in FIG. 1. Client computing devices may include personal computers, as well as any of a wide number and type of mobile devices, such as laptop computers, tablet computers, mobile phones, and so forth. By interacting with the client computing device, a member can request and receive web pages from the service 10. With some embodiments, the web pages will prompt the member to provide various member profile attribute information (e.g., schools and/or universities attended, academic degrees received, academic majors, employment history information, and so forth), which, is then communicated to the service 10 and stored in a storage device as member profile data 14.

The service 10 includes an external data interface 16 to receive data from one or more externally hosted sources. For instance, with some embodiments, certain information about companies and/or particular job titles or employment positions (e.g., salary ranges) may be obtained from one or more external sources. With some embodiments, such data may be accessed in real-time, while in other embodiments the data may be imported periodically and stored locally at the social network service that is hosting the recommendation application.

With some embodiments, the volume of member profile data that is available for processing is extremely large. Accordingly, as shown in FIG. 1, with some embodiments, the social network service 10 includes a data analysis and processing module 18. With some embodiments, this processing module may be implemented with a distributed computing system, such as Apache™ Hadoop™ The processing module 18 obtains as input various attributes of member profile information, and then processes this information to ensure that it is in a usable form for the recommendation application. For instance, the data normalizer module 20 will normalize various elements of data, ensuring that they conform to some standard that is used by the recommendation application. With some embodiments, the various job titles that members specify for themselves are normalized by deduplicating and disambiguating the job titles. For instance, in many cases, the same employment position will have a different job title at different companies. Accordingly, with some embodiments, the data normalizer module 20 will deduplicate job titles by mapping the different job titles, as specified in members' profiles, to uniquely named job titles for use with the recommendation application. In addition to deduplicating job titles, with some embodiments the data normalizer will disambiguate job titles. For instance, in many cases, a particular job title may be used in two different industries, such that the two employment positions represented by the same job title are really very different. A few examples include the job titles, "associate" and "analyst." A financial analyst may be a completely different position from a security analyst, and so forth. Accordingly, with some embodiments, the data normalizer 20 will analyze various elements of a member's profile to determine the industry in which the member works, such that the job title for the member can be specified uniquely for that industry. The originally input data, before standardization, may be stored in case it is needed in the future to check standardization. In that instance it is a copy of the originally input data that may be used for standardization by data normalizer module 20.

In addition to normalizing various items of information, with some embodiments, the processing module 18 obtains or otherwise derives a set of recommendation parameters from or based on profile attributes of the members for use in making recommendations as discussed below. At least with some embodiments, these parameters are updated periodically (e.g., daily, nightly, bi-daily, weekly, every few hours, etc.) to take into account changes members make to their profiles.

Recommendation parameters are stored for use with the recommendation application 22, as shown in FIG. 1 in a database with reference number 19. With some embodiments, the recommendation parameters are stored in a distributed key-value storage system, such as the open sourced storage system known as the Voldemort Project™. Also illustrated in FIG. 1 is a recommendation engine with reference number 24 which is used to process the recommendation parameters to obtain ranking results as discussed below. At run-time, the recommendation parameters are quickly retrieved, and then used with one or more sets or one or more vectors to determine ranking of schools, as one example, which may be provided to a member interface in absolute or weighted format. With some embodiments, the profile attributes specified by the member for use with the recommendation application may be separately stored with run-time session information, as illustrated in FIG. 1 with reference number 21.

As further illustrated in FIG. 1, the recommendation module 22 includes a recommendation engine 24, and a user interface (UI) module 26. The recommendation engine analyzes and aggregates the recommendation parameters and, in some cases, the member profile data, as discussed in greater detail below. The user interface module 26 includes logic for presenting the information in various formats, for example, as shown in the example user interfaces presented in the attached figures.

Certain attribute information from the member profiles of members of a social network service are retrieved and analyzed for the purpose of normalizing the information by the data normalizer 20 for use with the recommendation application 22. For instance, with some embodiments, job titles may be specified (as opposed to selected) by the members of the social network service and therefore will not be standardized across companies and industries. As such, with some embodiments, the normalizer module 20 will analyze the profile information from which certain job titles are extracted to ascertain an industry specific job title.

Accordingly, with some embodiments, the recommendation application will utilize a set of unique, industry specific job titles. Of course, other attributes beside job titles may also be normalized.

Figure 2:
FIG. 2 shows a user interface in the form of a college page that provides information about a particular college in accordance with an embodiment.

Career aspiration information, as one example, may be provided to the social network service in several ways. For example, FIG. 2 is a user interface that is a college page that provides information about a particular college. As used herein "college page" may be any organization's or entity's information display on a user interface that illustrates identity and attributes of an organization such as a college or other organization or entity. The college page is an example and the entity it represents is not limited to a school. In the case of a college page, the identity will be the name of the college or university or other school or other organization, and attributes include activities, connections, students following the school by social network, conversations concerning the school, the number of students interesting in attending the school in the future, ranking of the school, similar schools, and the like. Visitors to the college page who are seeking information about the college may operate the interactive pivot table 202 to find information about the college to the extent of the data included in the alumni profile of social network service.

A pivot table of this type is described in U.S. patent application Ser. No. 13/647,027, entitled "Methods and Systems for Obtaining and Presenting Alumni Data" and incorporated herein in its entirety by this reference. If the college is one of interest to the visitor, the member may click selectable icon 204 that enables the member to add the college page to the member's decision board, as discussed subsequently.

Figure 3:
FIG. 3 shows a user interface in the form of a field of study page that provides information about a field of study a member may be interested in, in accordance with an embodiment.

FIG. 3 is a user interface in the form of a field of study page, which may be referred to as a field of study display, that provides information about a field of study the member may be interested in, in accordance with an embodiment. A user, who may be a student, may enter a field of study as at the drop down menu 302. For example, the user may be interested in studying cognitive science which, when entered by way of drop down menu 302 becomes the subject of the field of study page as at 304. Alternately, instead of using a drop down menu of inputs which may be limited to predetermined inputs, the UI may be designed to enable the user to enter his or her own input by way of a search box. When this information is entered it is transmitted to the social network service that then searches its database of profiles to find current students 306 studying cognitive science and alumni 308 who have studied cognitive science. The profiles searched may be all the profiles in the social network service, or some smaller set such as the profiles of members in the social graph of the student. By the user clicking on 306 or 308, selectable images or other meta data 310 of the people studying cognitive science may be presented on the member's field of study page 300. Clicking on the icon of a particular image or other meta data 310 will allow the member to access a particular member's profile or field of study page to learn more about the person, their aspirations, achievements, and other information that may be helpful in making the decision under discussion. Further, helpful alumni data may be seen and accessed as at 312, and as described in the above-referenced U.S. patent application Ser. No. 13/647,027.

Figure 4:
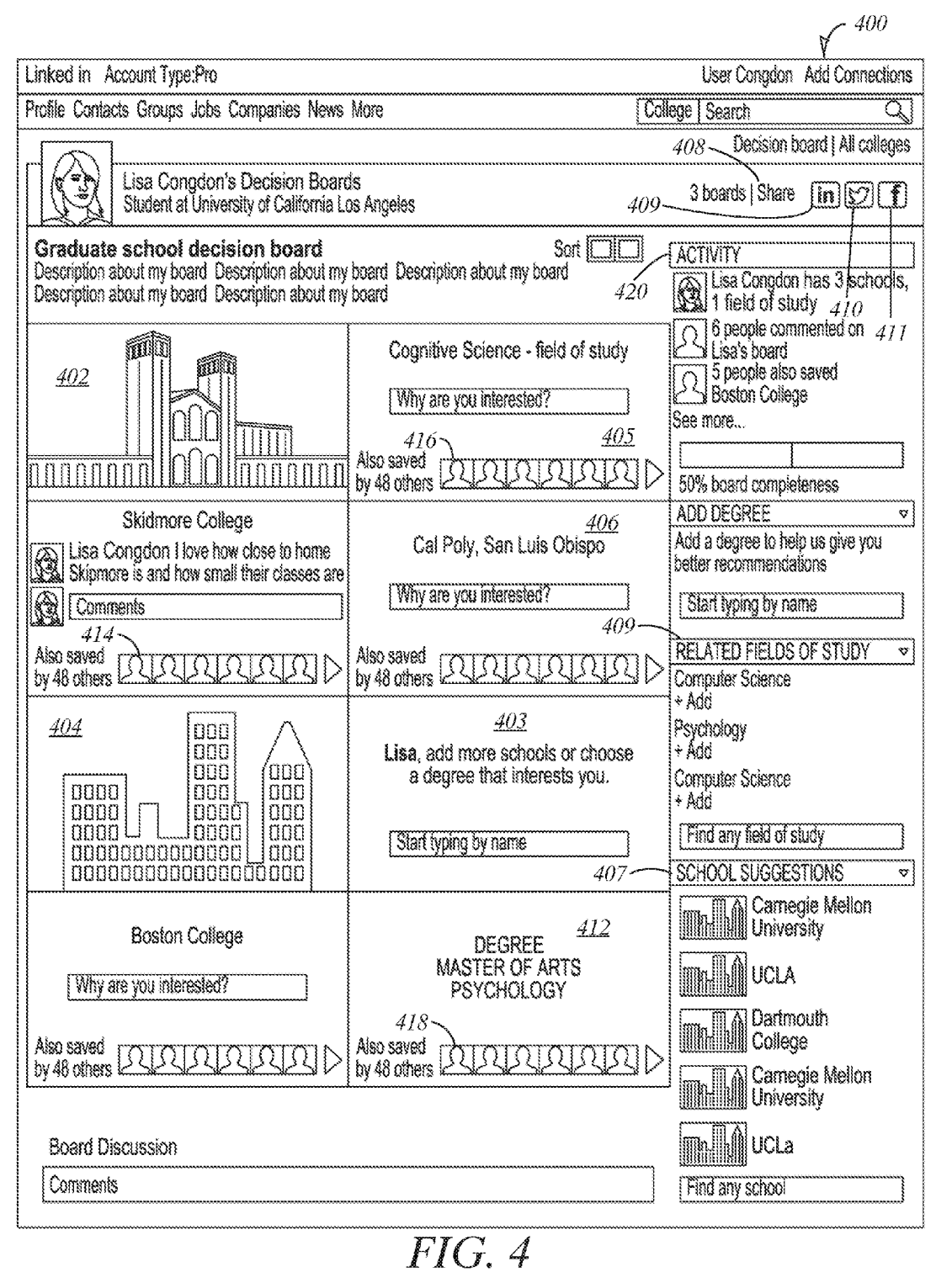

FIG. 4 shows a user interface in the form of a decision board 400, sometimes referred to as a decision user interface, according to an embodiment. In FIG. 4 the member, here Lisa, has pinned a college page of interest, here Skidmore College 402, also seen in FIG. 2, and a field of study 405 that indicates a field of study she is interested in, here Cognitive Science, also seen in FIG. 3, to her decision board 400. Lisa may choose a degree that interests her as at 403, either by typeahead that enters the name from the first few letters typed, or by typing the full name and entering that name, either by depressing Enter, or by selectable entry icon that may be displayed at 403, if desired. Lisa has added another college page, that of Cal Poly, at 406 to her decision board 400. The data from a college page and from the field of study page may be transmitted to the system. The system may then compare the college which is the subject of the college page, for example, Skidmore College, to other colleges stored in the system, and display on the member's decision board 400 the names of suggested similar schools as at 407. Similar schools may be determined as described in U.S. patent Ser. No. 13/647,004 entitled "Methods and Systems for Identifying Similar Entities," filed on even date herewith, assigned to the common assignee, and incorporated herein by reference in its entirety. Recommended schools may also be determined as set forth in FIG. 8, discussed subsequently. For a decision interface that includes plural college pages such as Skidmore College 402 and Cal Poly 406, appropriate timing means, not shown, may be provided in one embodiment to enable the system to search separately in respect of Skidmore College and separately in respect of Cal Poly. The system likewise searches its member profiles and displays on the decision board a plurality of selectable icons 414 or other meta data (here placed on the Skidmore College page 402 of Decision Board 400) indicating other members who have placed Skidmore College on their decision boards. The same or similar operation may be performed for Cal Poly in the embodiment of FIG. 4.

Similarly, placing the cognitive science field of study page 405 on the decision board 400 will result in the system searching its member profiles and displaying a plurality of selectable icons 416 or other meta data of members who have placed the same field of study on their decision boards.

Lisa may also add to her decision board 400 a degree she is interested in by entering the degree at 403. When entered, the degree may be displayed on Lisa's decision board at 412. The degree is entered as data to be transmitted to the system which will then compare the degree to other degrees stored in the system. The system will then display on the Lisa's decision board 400 the names of suggested schools offering the degree, again at 407 or at some other suitable area of decision board 400, much the same as was discussed for college pages and field of study pages above. Similarly, the system may search its member profiles and/or the decision boards of other members to determine members who have the same degree, or who have an interest in obtaining the same degree. The system may display on Lisa's decision board 400 a plurality of selectable icons 418 or other meta data of members who have placed the same degree on their decision boards or who have otherwise expressed an interest in the degree on their profile.

By selecting any of the plurality of icons 414, 416, 418, the member will be able to access the profiles, field of study pages, college pages of interest, and decision boards of other members who are making the same or similar decisions as the member, and who have similar interests, or a similar set of interests, in colleges, fields of study, and/or degrees. The member, here Lisa, may also add to her decision board 400 an organization or college page or degree she sees on one of the decision boards accessed by selecting an icon of the groups of icons 414, 416, or 418. For example, Lisa may have selected an icon 414 of a particular member, viewed the selected member's decision board, seen a Boston College college page on the selected member's decision board, decided she may be interested in Boston College and, consequently, added Boston College to the her decision board at 400. This may be done by a selectable icon on the college page that is pinned to the decision board being viewed by Lisa, that is, the decision board of a member accessed by icon 414.

Figure 5:
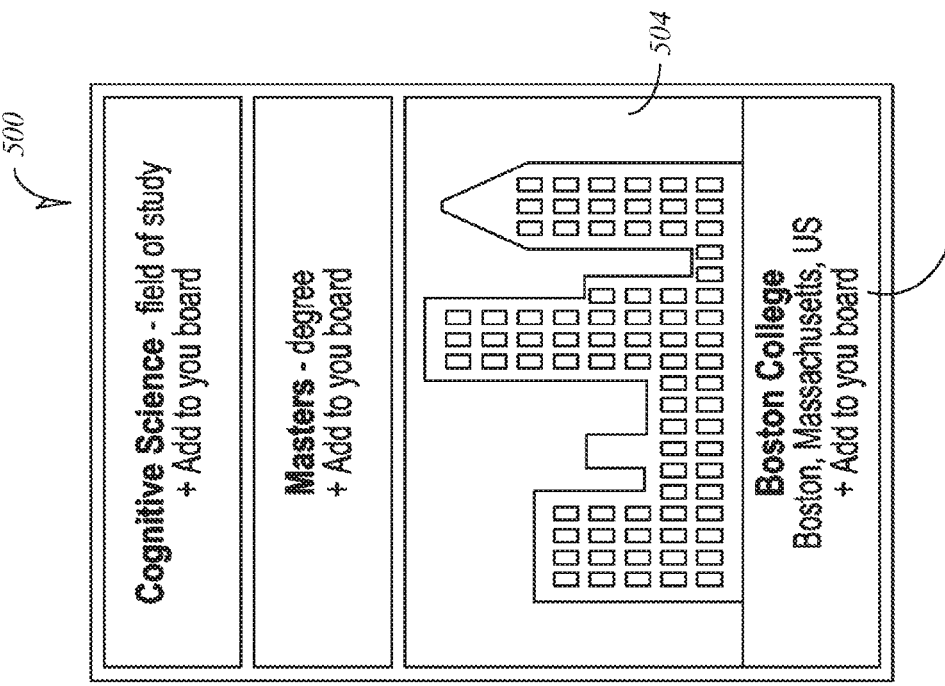
FIG. 5 shows three items that a first member is viewing on the decision board of a second member, where the three items have not yet been added to the first member's decision board, according to an embodiment.

An example of this is seen in FIG. 5 where there is seen, in partial view, a decision board 500 that is seen by Lisa when accessing a member icon at 414 of FIG. 4. A college page seen in partial view, here Boston College 504, is pinned to, or has been added to, or appears on, decision board 500. Lisa may pin or add the Boston College college page 504 to her decision board by selecting the "add to your board" icon 502 of FIG. 5. The system will then add the Boston College college page to Lisa's decision board of FIG. 4 as at 404.

Figure 6:
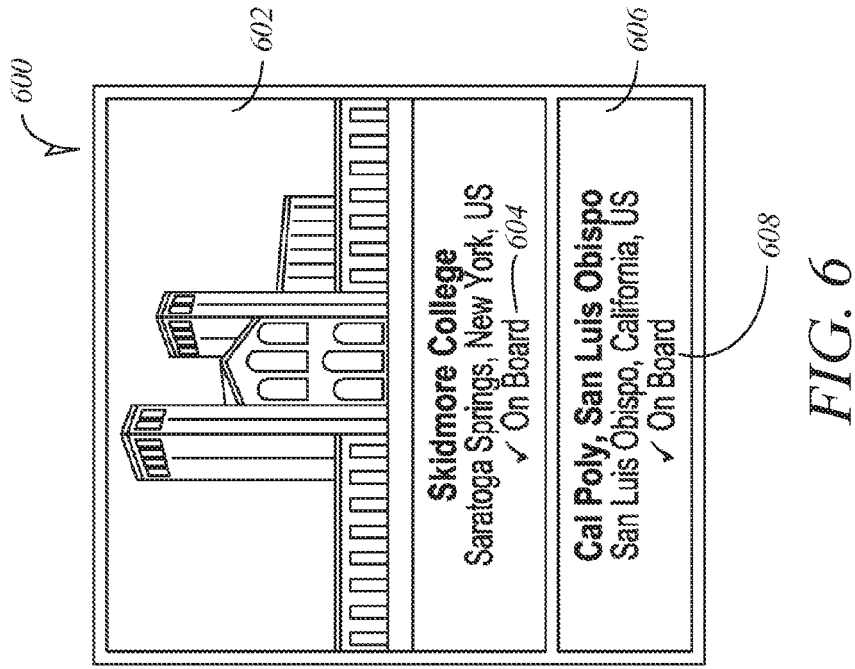
FIG. 6 shows two items that a first member is viewing on the decision board of a second member, where the two items have already been added to the first member's decision board, according to an embodiment.

When Lisa selects a member icon 414 at FIG. 4 as described above, and accesses that member's decision board, she may see that that member has also added some of the same college pages as Lisa has on her college page of FIG. 4. This is seen in FIG. 6 where there is seen, in partial view, decision board 600, where the member Lisa accessed by selectable icon 414 had added Skidmore College 602 and Cal Poly 606 to that member's decision board. When Lisa accessed that member's decision board at 414, the system searched Lisa's member profile, found her decision board, and compared its contents against the contents of decision board 600, and determined that Lisa had already added both Skidmore College 602 and Cal Poly 606 to her decision board. Therefore, in the rendering of the decision board Lisa accessed by selectable icon 414, the entries for Skidmore College 602 and Cal Poly 606 have the icon "On board" 604 and 608, respectively, in order to notify Lisa that she already has these entities or items on her board and need not add them.

The member, here Lisa, may email a copy of her decision board 400 to friends and family as at 408, and receive by email or other modes of communication recommendations relevant to Lisa's decision. The member may also send the decision board 400 out to friends or others on other social network services such as by using the LinkedIn icon 409, Twitter icon 410, or Facebook icon 411, or other relevant icons, and ask for and receive back recommendations for schools, fields of study, or other comments relevant to the decision under discussion.

Flowcharts

Figure 7:
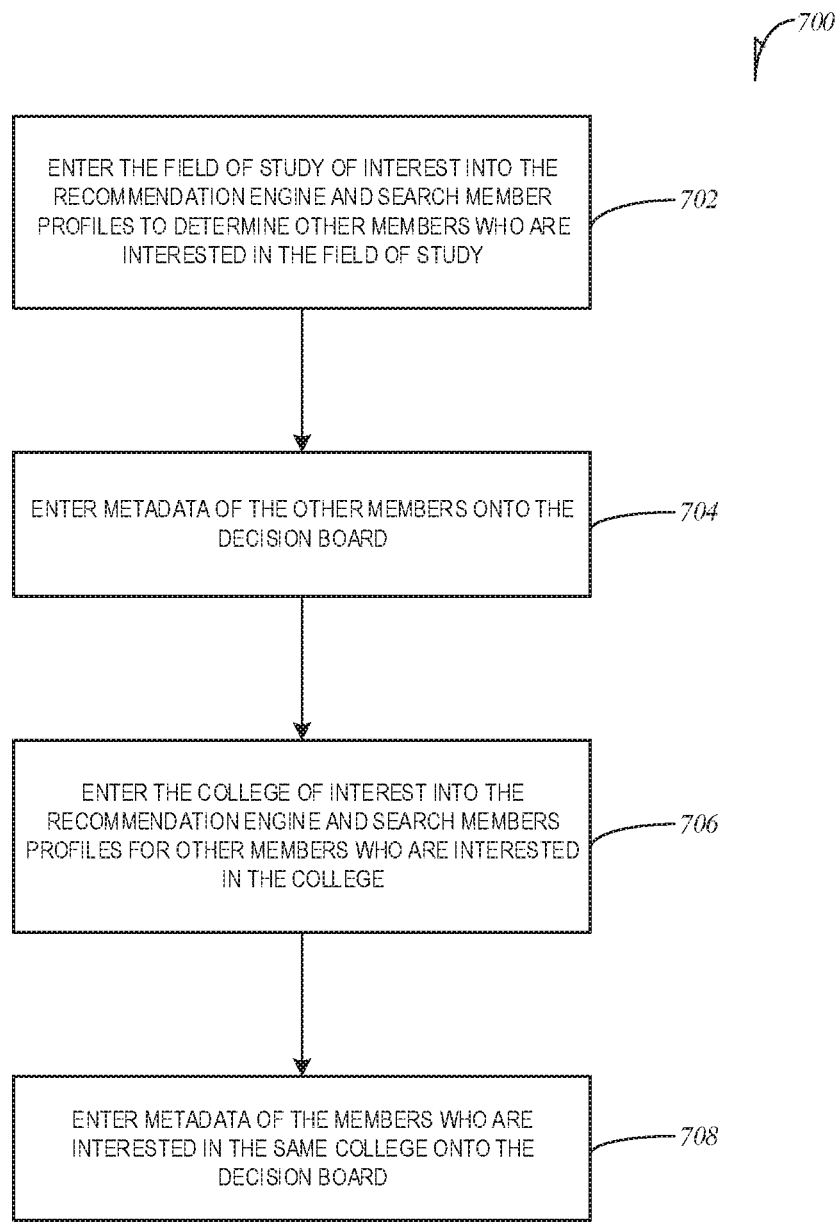
FIG. 7 is a flow chart illustrating the operation of a recommendation engine to determine data relevant to a decision being made, according to an embodiment.

FIG. 7 is a flow chart illustrating the operation 700 of a recommendation engine to determine data relevant to a decision being made, according to an embodiment. The operations of FIG. 7 are set forth in a particular order but one of ordinary skill in the art will recognize that the operations may be arranged in different order and reach the same or a similar result. At 702 the system enters the field of study of interest into the recommendation engine 19 of FIG. 1 which searches member profiles to determine other members who are interested in that field of study and at 704 enters metadata of those other members onto the decision board as at 416 of FIG. 4. At 706 the system enters the college of interest, here Skidmore College, 402, into the recommendation engine and searches member profiles for other members who are interested in the college. In one embodiment this may be accomplished by accessing college boards included on decision boards of other members to determine their colleges of interest. The system may then at 708 enter metadata of the members who are interested in Skidmore College, in this example, onto the decision board 400 of FIG. 4 at 414.

Figure 8:
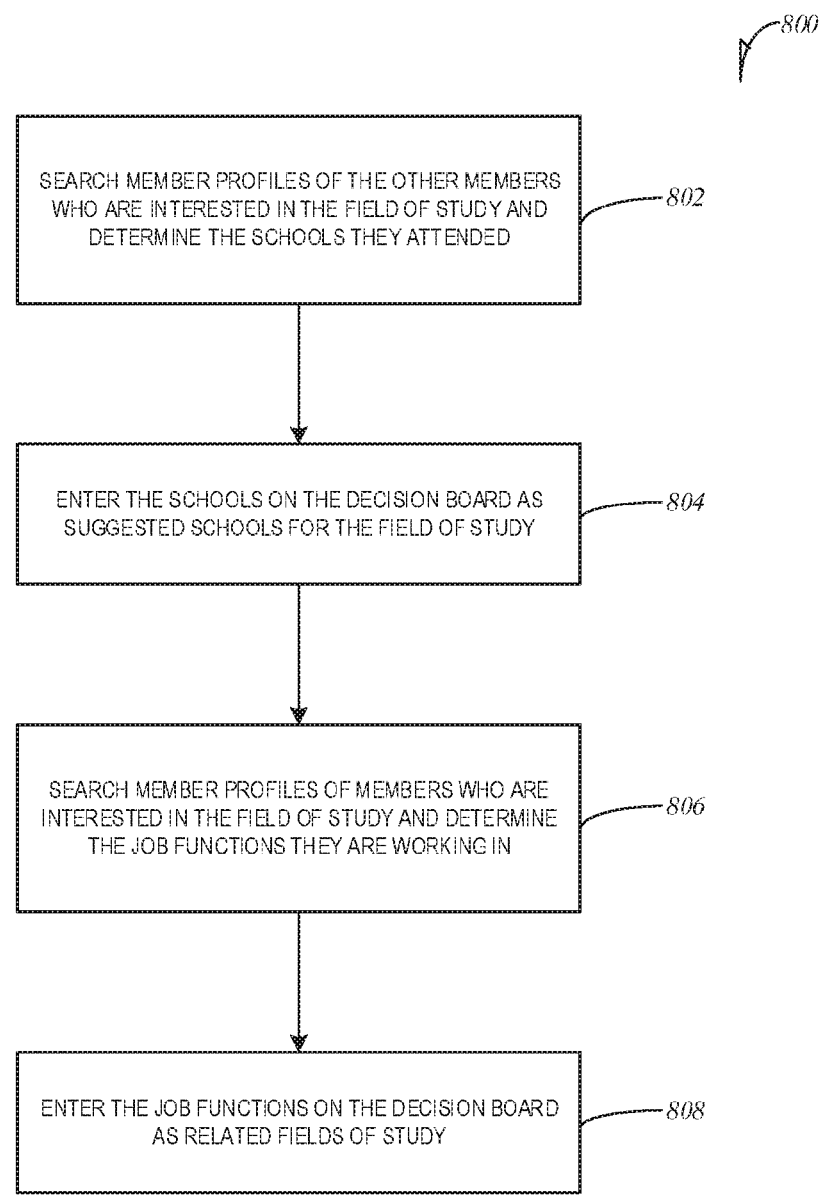
FIG. 8 is a flowchart illustrating another operation of a recommendation engine to determine data relevant to a decision being made, according to an embodiment.

FIG. 8 is a flowchart illustrating another operation 800 of a recommendation engine to determine data relevant to a decision being made, according to an embodiment. At 802 the system may use recommendation engine 19 of FIG. 1 to search member profiles of the other members who are interested in the field of study seen at 405 of FIG. 4 and determines the schools the members attended. This may be accomplished, in one embodiment, by accessing field of study on the decision boards of the other members. At 804 the schools so determined may be entered on the decision board 400 of FIG. 4 as suggested schools for the field of study as at 407. The system may then at 806 search member profiles of members who are interested in the field of study and determine the job functions those interested members are working in. At 808 the system may enter those job functions on the decision board 400 of FIG. 4 as related fields of study 409.

Figure 9:
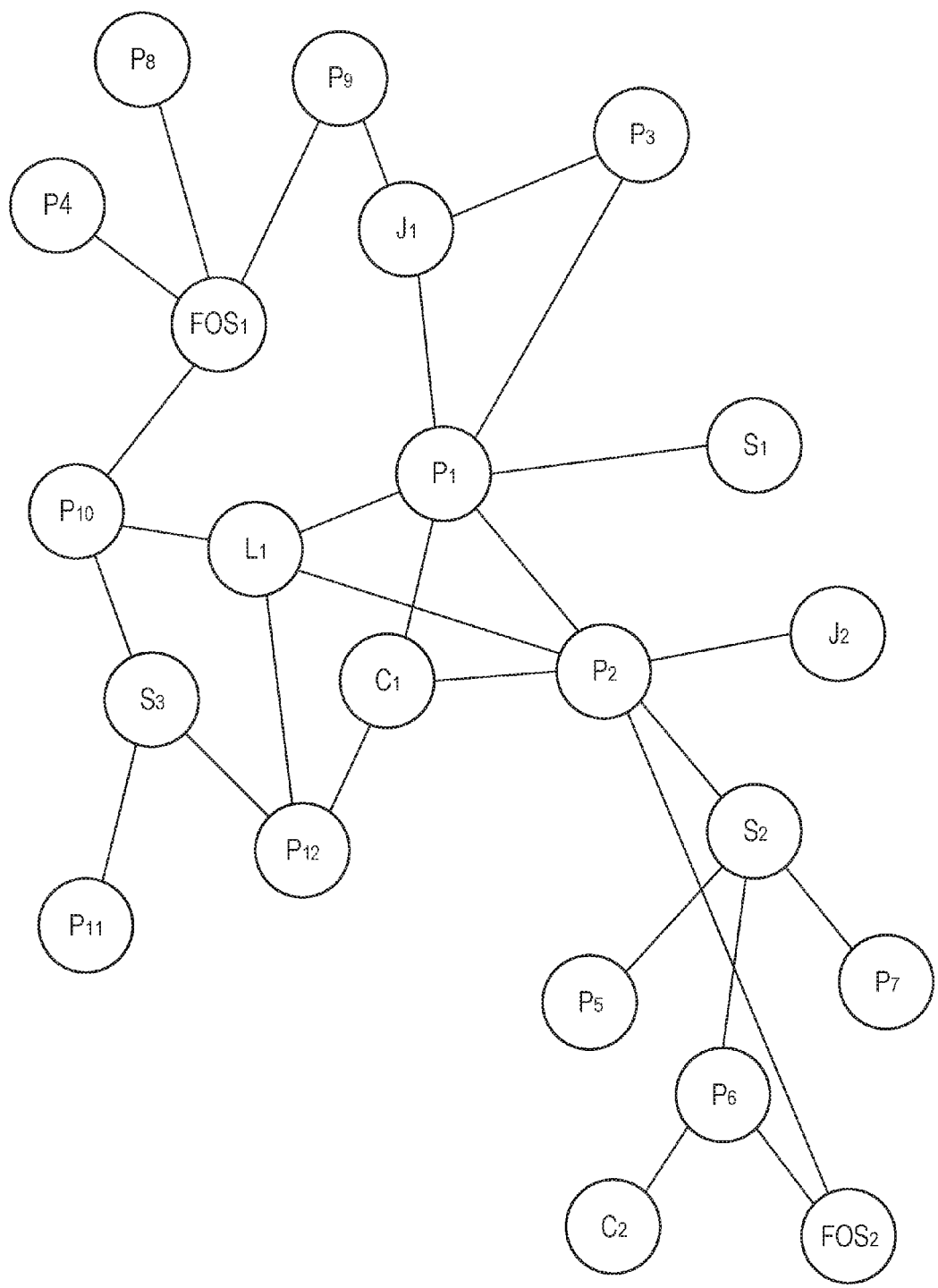
FIG. 9 is an illustration of part of the social graph of the social network service.

The above and other aspects of various embodiments can be understood by considering the amount of information available to the social network service. For example, and as discussed previously, many social network services require or request that each member provide personal information about himself or herself, such as professional information including information regarding their educational background such as field of study at college, employment position or job, company of current employment, location of that company, and so forth. This information is frequently referred to as "profile" information, or "member profile" information. A view of a small part of the social graph of the social network service 10 of FIG. 1 is seen in FIG. 9. In that figure, some, but not all, of the connections and attributes of various members of the social network service are illustrated. For example, member P1 attended school S1, works at company C1 at location L1 and majored in field of study FOS1 when at school S1. At company C1, P1 has job J1. Location L1, school S1, company C1 and job J1 are said to be attributes of P1. Further to the example of FIG. 9, P2 went to school S2, studied field of study FOS2, has job J2 and, like member P1, is employed at company C1 at location L1. Other members who attended school S2 are members P5, P6, and P7. Members P4, P8, P9, and P10, also have field of study FOS1. Member P10 attended school S3, which was also attended by members P11 and P12. Tracing through the figure, which is not intended to be a complete set of attributes of the members illustrated, can provide additional information about the various attributes of the various members in the figure. When the entire social graph of the social network service is considered, an immense amount of information about members and their attributes can be determined.

In view of the amount of member profile information available to the social network service, embodiments are not limited to the recommendation application 22 searching merely for a single school or a single focus of study as the type of candidate desired for the recommendation. As one example, the recommendation engine 24 may analyze the attributes of the member profiles as described above and determine from the member attributes the members who graduated with a degree in cognitive science, and the schools from which the members received their degrees in cognitive science. The recommendation engine may determine, as one example, the school from which the most members received their degree in cognitive science and recommend that school to the member seeking to make a decision. Or schools, in a ranked order desired by the system designer, for example the top five schools by number of degrees in cognitive science awarded to members, could be presented to the user by the recommendation engine.

Further, the recommendation application may search the attributes of the member profiles and determine that people who pursued computer science as a field of study had jobs as computer programmers. The system may also determine from the attributes of the profiles that some members who were computer programmers pursued mathematics instead of computer science as a field of study. In an embodiment, these two fields of study may be considered as equivalent with respect to obtaining a job as a computer programmer. If the user were seeking one of the best schools for becoming a computer programmer, the recommendation engine, from the foregoing search, could recommend schools that ranked high in awarding degrees in computer science and in awarding degrees in mathematics to members.

A recommendation may also be refined. For example, if the user, after entering forensic science as a field of study and receiving recommendations were then to enter an additional field of study at 302 of FIG. 3, for example, forensic psychology, the recommendation application may search member profiles to determine which schools provided degrees in both cognitive science and forensic psychology and present these schools, in some ranked order if desired, to the user. Given that there is now an additional field of study, here forensic psychology, the school or schools recommended for cognitive science alone would likely change, thus refining the recommendation based on the user's additional aspiration of forensic psychology.

Generally speaking, the system can provide recommendations for nearly any use case if the user specifies his or her aspirations, such as in one embodiment providing a field of study and a location of the country desired for employment, and requesting recommendations for companies in that location that hire people who pursued that field of study. It may be appropriate to modify the user interface of FIG. 3 as needed to accept two sets of attributes (where a set may include a single element). One of ordinary skill in the art, given the information described above, would understand how to modify the user interface to accept, for example, two attributes as input (for example a field of study and a desired location), and also to accept a desired recommendation candidate type (for example, companies for employment). The member profiles could be searched, the people having the aspired-to field of study in the aspired-to location as attributes could be determined, and the company or companies they are employed at in that location could also be determined. Those companies could be recommended to the user.

Further, if a user were a manager in a particular company and was seeking to hire, for example, a product manager, that user may input qualifications as attributes, such as field of study and product manager as the job type, and receive back a list of members of the social network service that have those attributes. Further, the attributes inputted as qualifications for the desired recommendation need not be limited to two attributes, but could include a further desired number of attributes.

The user seeking to hire a product manager might also input attributes to determine people in the user's own company who are also seeking to hire a product manager and then collaborate with them in determining which of the recommendations returned to the manager as job candidates might be best for that position. This is similar in nature to the above example of inputting a field of study and getting back names of members who are also interested in that field of study, along with comments. Stated another way, the method might include inputting the attributes sought after in making a decision, receiving a recommendation of candidates for that decision (whether schools to attend, fields of study to pursue, personnel to hire, job types, companies for employment, and the like), and inputting attributes for a set of people, peer group or otherwise, with whom to collaborate on making the decision the user is seeking to make, or for other social processing or communication.

Figure 10:
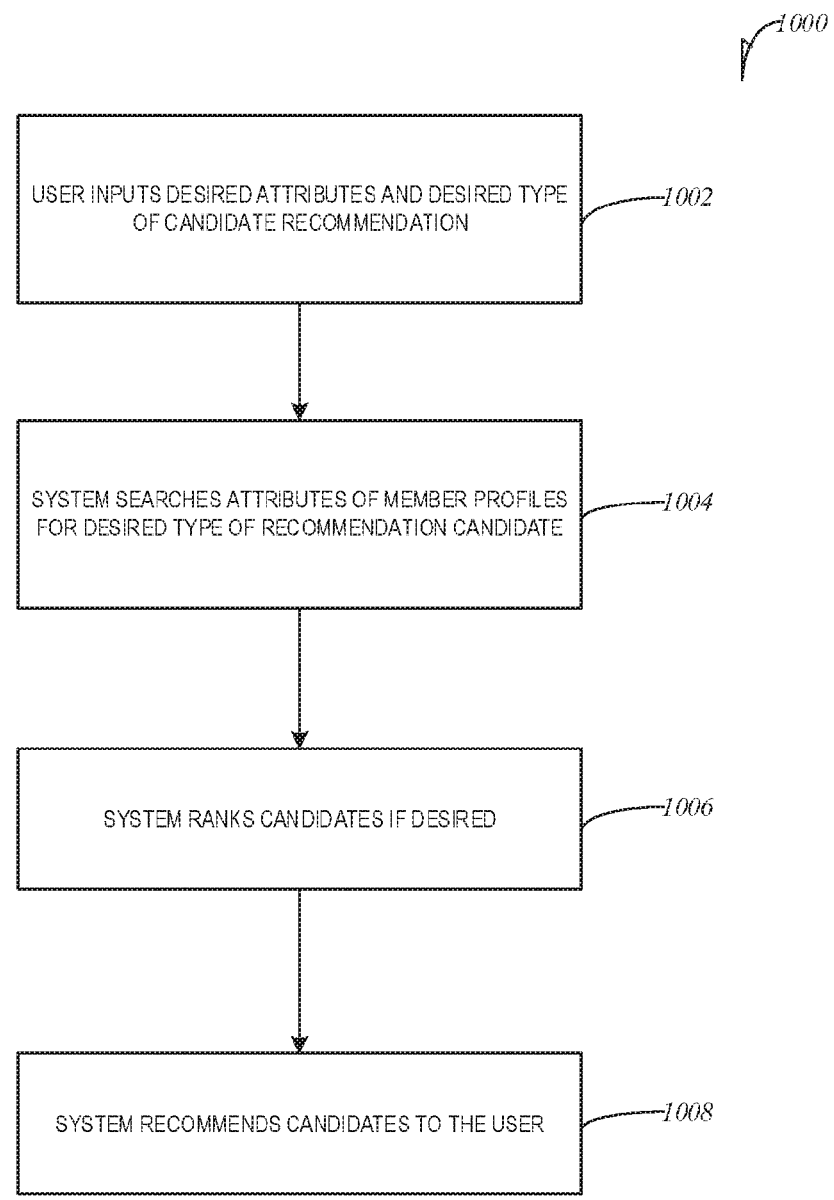
FIG. 10 is a flow chart showing operation of another algorithm that may be executed by a computer processor according to an embodiment.

Referring now to FIG. 10 there is seen a method 1000 of an embodiment as described above. At 1002 the user inputs aspired-to (which may mean desired) attributes (such as cognitive science as a field of study) and the desired type of candidate recommendation (school, location, job type, or company, as discussed above). At 1004 the system searches the attributes of member profiles for the type of recommendation candidate with the desired attributes. At 1004 the system may, if desired, rank the candidates such as in a manner described above, as one example. Finally, at 1008 the system recommends one or more candidates to the user. The user could then if desired operate the method again with another set of aspired-to attributes (for example forensic psychology as a field of study) for a second recommendation (for example, school, location, job type, or company). The system will again return a recommendation which may be a refinement of the first recommendation, as discussed above. Of course, in some cases more than two sets of input attributes may be input. In another example, if one of the above operations were for a recommended candidate having the input attributes as a candidate for a decision such as, in one example for hiring, the second operation could have as input attributes a set of desired attributes for a recommendation of a set of people for social collaboration or social communication with respect to the first recommendation.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 11:
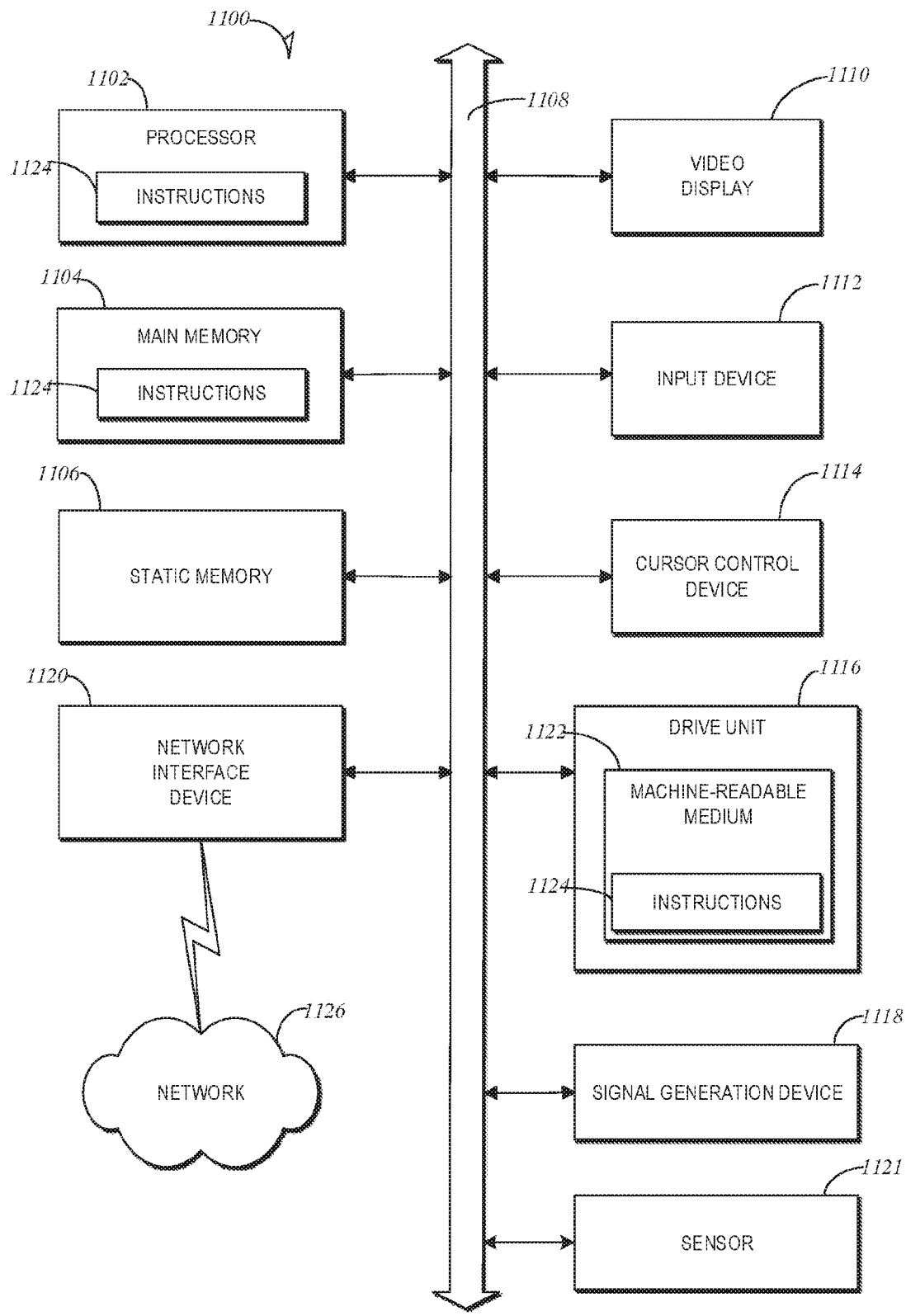
FIG. 11 is a block diagram of a machine in the example form of a computer system within which a set of instructions for causing the machine to perform one or more of the methodologies discussed herein.

FIG. 11 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1101 and a static memory 1106, which communicate with each other via a bus 1108. The computer system 1100 may further include a display unit 1110, an alphanumeric input device 1117 (e.g., a keyboard), and a user interface (UI) navigation device 1111 (e.g., a mouse). In one embodiment, the display, input device and cursor control device are a touch screen display. The computer system 1100 may additionally include a storage device 1116 (e.g., drive unit), a signal generation device 1118 (e.g., a speaker), a network interface device 1120, and one or more sensors 1121, such as a global positioning system sensor, compass, accelerometer, or other sensor.

The drive unit 1116 includes a machine-readable medium 1122 on which is stored one or more sets of instructions and data structures (e.g., software 1123) embodying or utilized by any one or more of the methodologies or functions described herein. The software 1123 may also reside, completely or at least partially, within the main memory 1101 and/or within the processor 1102 during execution thereof by the computer system 1100, the main memory 1101 and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1123 may further be transmitted or received over a communications network 1126 using a transmission medium via the network interface device 1120 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   presenting, by at least one computer processor, a decision user interface to a first member of a social network service;
   receiving, via the decision user interface, a name of a school that the first member is interested in attending, a name of a field of study that the first member is interested in, and a name of an academic degree that the first member is interested in;
   searching one of profiles of other members of the social network service or decision user interfaces of other members of the social network service, or other Internet information; and
   responsive to the searching,
      identifying schools that are similar schools to the school that the first member is interested in attending and displaying, automatically and without intervention of the first member, names of the similar schools on the decision user interface of the first member;
      identifying other members of the social network service who are interested in the field of study and displaying, automatically and without intervention of the first member, names of the other members interested in the field of study on the decision user interface of the first member;
      identifying other members of the social network service that are interested in the academic degree and displaying, automatically and without intervention of the first member, on the decision user interface of the first member, names of the other members of the social network service that are interested in the academic degree;
   receiving, via the decision user interface of the first member, selection of a second member, the second member being one of the other members interested in the field of study or one of the other members interested in the academic degree; and
   responsive to receiving the selection of the second member,
      displaying the decision user interface of the second member to the first member;
      comparing at least part of the content of the decision user interface of the second member to at least part of the content of the decision user interface of the first member; and
      notifying the first member of the content on the decision user interface of the second member that is already entered on the decision user interface of the first member,
      wherein the first member is enabled to view the decision user interfaces of any of the other members and to add to the decision user interface of the first member information that appears on the decision user interface of any of the other members.

2. The method of claim 1, wherein the names of the similar schools are selectable and wherein the names of the similar schools, when selected, enable the first member to gain access to an organization information display of the similar schools.

3. The method of claim 1 wherein the names of the other members interested in the field of study are selectable and wherein the names of the other members interested in the field of study, when selected, enable the first member to gain access to one of member profiles of, or the decision user interfaces of, the other members interested in the field of study.

4. The method of claim 1 further comprising presenting to the decision user interface of the first member names of schools that offer the academic degree.

5. A machine-readable hardware storage device having embedded therein a set of instructions which, when executed by a machine, causes execution of operations comprising:
  presenting a decision user interface to a first member of a social network service;
  receiving, via the decision user interface, a name of a school that the first member is interested in attending, a name of a field of study that the first member is interested in, and a name of an academic degree that the first member is interested in obtaining;
  searching one of profiles of other members of the social network service or decision user interfaces of other members of the social network service, or other Internet information; and
  responsive to searching,
  identifying schools that are similar schools to the school that the first member is interested in attending and displaying, automatically and without intervention of the first member, names of the similar schools on the decision user interface of the first member;
  identifying other members of the social network service who are interested in the field of study and displaying, automatically and without intervention of the first member, names of the other members interested in the field of study on the decision user interface of the first member;
  identifying other members of the social network service that are interested in the academic degree and displaying on the decision user interface of the first member, automatically and without intervention of the first member, names of other members of the social network service who are interested in the academic degree;
  receiving, via the decision user interface of the first member, selection of a second member, the second member being one of the other members interested in the field of study or one of the other members interested in the academic degree; and
  responsive to receiving the selection of the second member,
  displaying the decision user interface of the second member to the first member;
  comparing at least part of the content of the decision user interface of the second member to at least part of the content of the decision user interface of the first member; and
  notifying the first member of the content on the decision user interface of the second member that is already entered on the decision user interface of the first member,
    wherein the first member is enabled to view the decision user interfaces of any of the other members and to add to the decision user interface of the first member information that appears on the decision user interface of any of the other members.

6. The machine-readable hardware storage device of claim 5 the operations further comprising enabling the first member to provide information presented at the decision user interface of the first member to third parties.

7. The machine-readable hardware storage device of claim 5 the operations further comprising enabling the first member to view the decision user interface of additional members of the social network service and add to the decision user interface of the first member information that appears on the decision user interface of the additional members.

8. The machine-readable hardware storage device of claim 5 wherein the names of the similar schools are selectable and wherein the names of the similar schools, when selected, enable the first member to gain access to an organization information display of the similar schools.

9. The machine-readable hardware storage device of claim 5 wherein the names of other members interested in the field of study are selectable and wherein the names of the other members who are interested in the field of study, when selected, enable the first member to gain access to one of member profiles of or decision user interfaces of, the other members who are interested in the field of study.

10. The machine-readable hardware storage device of claim 5 the operations further comprising presenting to the decision user interface of the first member the names of schools that offer the academic degree.

11. A system comprising:
  at least one computer processor and computer storage configured to:
    present a decision user interface to a first member of a social network service;
    receive, via the decision user interface, a name of a school that the first member is interested in attending, a name of a field of study that the first member is interested in, and a name of an academic degree that the first member is interested in;
    search one of profiles of other members of the social network service or decision user interfaces of other members of the social network service, or other Internet information; and
    responsive to searching,
      identify schools that are similar schools to the school that the first member is interested in attending and display, automatically and without intervention of the first member, names of the similar schools to the decision user interface of the first member;
      identify other members of the social network service who are interested in the field of study and display, automatically and without intervention of the first member, names of the other members interested in the field of study on the decision user interface of the first member;
      identify other members of the social network service that are interested in the academic degree and display on the decision user interface of the first member, automatically and without intervention of the first member, names of other members of the social network service who are interested in the academic degree;
      receive, via the decision user interface of the first member, selection of a second member, the second member being one of the other members interested in the field of study or one of the other members interested in the academic degree; and
      responsive to receipt of the selection of the second member,
        display the decision user interface of the second member to the first member;
        compare at least part of the content of the decision user interface of the second member to at least part of the content of the decision user interface of the first member; and
        notify the first member of the content on the decision user interface of the second member that is already entered on the decision user interface of the first member,
          wherein the first member is enabled to view the decision user interfaces of any of the other members and to add to the decision user interface of the first member information that appears on the decision user interface of any of the other members.

12. The system of claim 11, the at least one processor and computer storage further configured to provide second members of the social network service with access to the decision user interface of the first member and to enable the second members to provide comments to the first member about the school via the decision user interface of the first member.

* * * * *